United States Patent [19]
Tang

[11] Patent Number: 5,433,319
[45] Date of Patent: Jul. 18, 1995

[54] STRUCTURE FOR COMPACT DISK CASE

[75] Inventor: Wen-Chou Tang, Taoyuan County, Taiwan

[73] Assignee: Shih-Hsien Lin, Taipei, Taiwan

[21] Appl. No.: 202,364

[22] Filed: Feb. 25, 1994

[51] Int. Cl.6 .............................................. B65D 85/57
[52] U.S. Cl. .................................. 206/308.1; 206/310; 220/345
[58] Field of Search ........................ 206/303, 307–313, 206/387, 444, 308.1; 220/345, 346, 351

[56] References Cited

U.S. PATENT DOCUMENTS

| | | | |
|---|---|---|---|
| 4,520,470 | 5/1985 | d'Arc | 206/310 |
| 4,899,875 | 2/1990 | Herr et al. | 206/309 |
| 4,993,552 | 2/1991 | Bugbey et al. | 206/309 |
| 5,244,085 | 9/1993 | Lammerant et al. | 206/310 |
| 5,249,677 | 10/1993 | Lim | 206/313 |

Primary Examiner—Jimmy G. Foster
Attorney, Agent, or Firm—Alfred Lei

[57] ABSTRACT

The present invention provides an improved structure for compact disk cases comprising a hollow rectangular case body having a fully open top portion, a disk holder placed in the case body, and a cover plate covering the case body, the left and right sidewalls of the case body being each provided at the lower section with a groove extending from the front to the rear, and the bottom ends of the left and right sidewalls of the cover plate being each formed inwardly with an integral guide rail for the cover plate to slip-fit with the case body such that when both are closed together, the stop strip on the front side of the cover plate snaps into the arcuate ducts in the front end of the disk holder, and in use, by properly applying force, the cover plate will be slid backward to position, thus resulting in smooth and positive sliding to open and close for the structure as a whole.

1 Claim, 5 Drawing Sheets

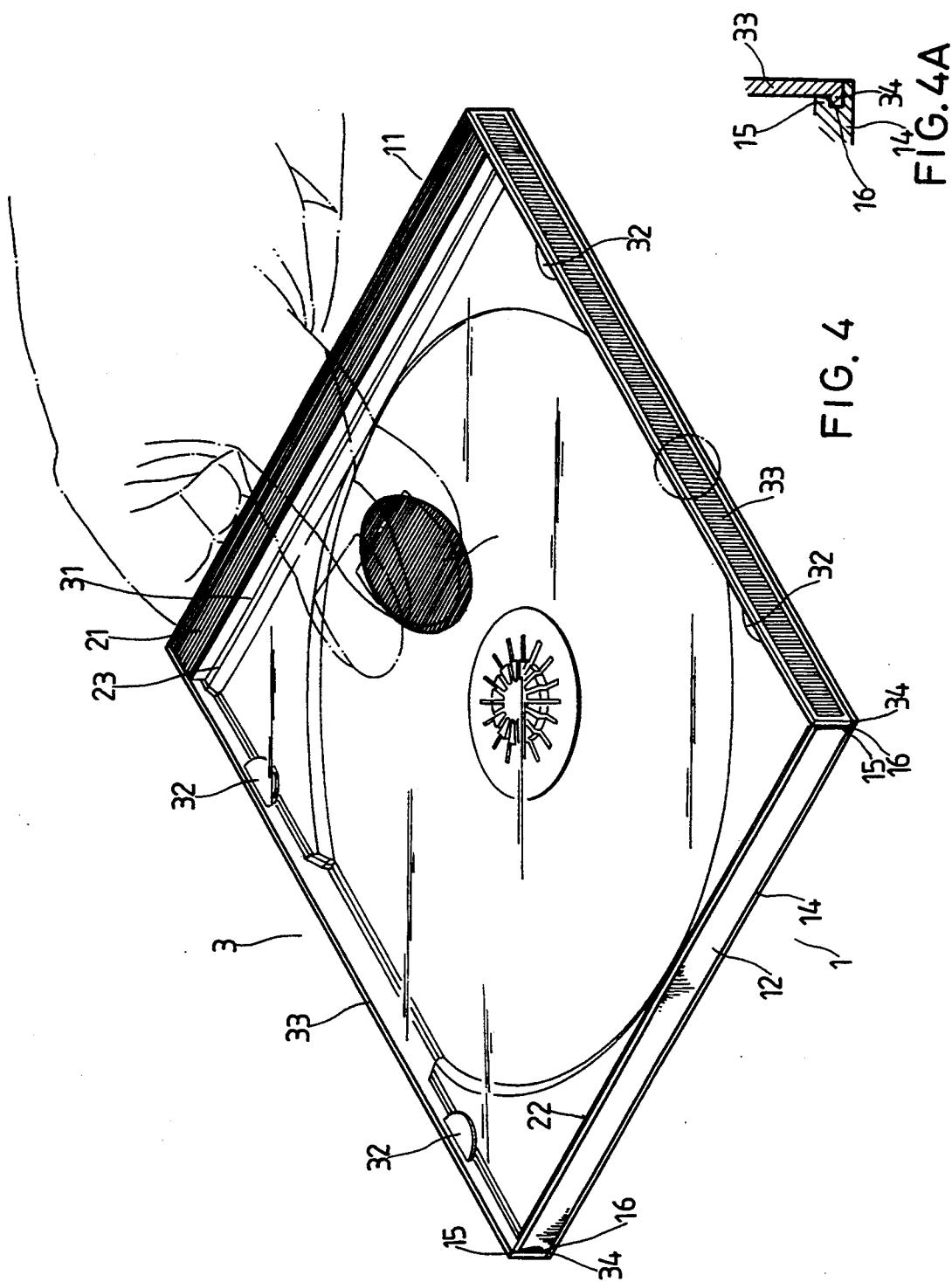

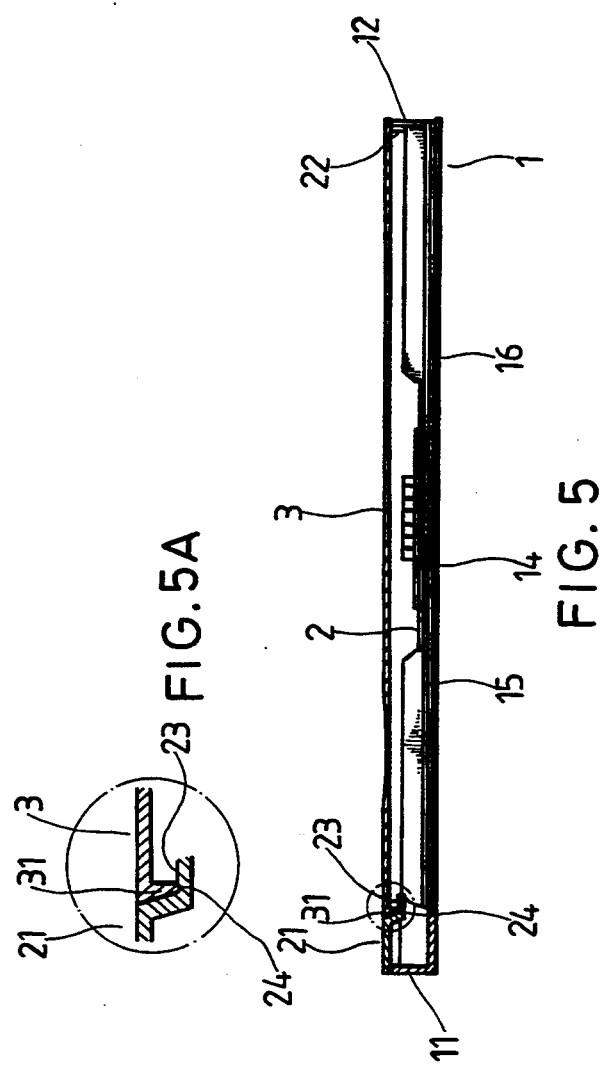

STRUCTURE FOR COMPACT DISK CASE

The present invention relates to an improved structure for compact disk cases and, in particular, to such a structure wherein the left and right sidewalls of the case body are each provided with a groove extending from the front to the rear, and the cover plate is provided with mating guide rails such that the cover plate can be slip-fit to become assembled to the cover body for closing and opening to position.

It is known that compact disks (CD's) are placed with each single disk in a separate case for storage, packaging, and display purposes. Referring to FIG. 1, there is shown a perspective view of a conventional CD case. The conventional CD case comprises a hollow rectangular case body A having a fully open top portion, a disk holder B placed in the case body A, and a cover plate C covering the case body A. Each CD case is used for placing only one CD (not shown).

The case body A has front, rear, left and right sidewalls, the left and right sidewalls being each oppositely provided at the front section with a large round hole D for the round pins E provided on the left and right sidewalls of the cover plate C to be inserted thereinto, thereby enabling the cover plate C to swing. The left and right sidewalls of the case body A are each oppositely formed at the rear section with a small round hole F and the left and right sidewalls of the cover plate C are formed at opposite places with flanges G such that when the cover plate C is closed down toward the case body A, the flanges G on the left and right sidewalls of the cover plate C are forced to be embedded in the small holes F on the case body A and become secured. When to open the CD case, a user holds the case body A with one hand and lift the cover plate C to open with the fingers of the other hand. Opening of the CD case in this manner is not a smooth operation which, indeed, is troublesome to both the manufacturers and the consumers, but there is no way to effectively solve the problem.

In view of the fact the conventional CD cases have to be opened with both hands in an operation which is neither smooth nor convenient.

Directing to the above disadvantages, elaborate analyses, continued trials and tests have been made and, finally after numerous improvements, successfully developed the improved structure for compact disk cases of the present invention.

The primary object of the present invention is to provide an improved structure for CD cases wherein the left and right Sidewalls are each provided with a groove extending from the front to the rear and the cover plate is provided with mating guide strips such that both can be slip-fit with each other. A consumer can open the CD case by holding the bottom of the case body with four fingers of one hand with only the thumb of the same hand applying force to push the cover plate, driving the cover plate to slide backward to position and then the CD can be easily take out. The entire operation of opening and closing is both smooth and exact.

The above object of the present invention, the technical means utilized, and the effects thereof will be described in greater detail by way of a feasible embodiment given in conjunction with the accompanying drawings in which:

FIG. 4 is a perspective view showing the embodiment of the CD case of the present invention in closed condition.

FIG. 5 is a cross section view showing the embodiment of the CD case of the present invention.

Figure 1:
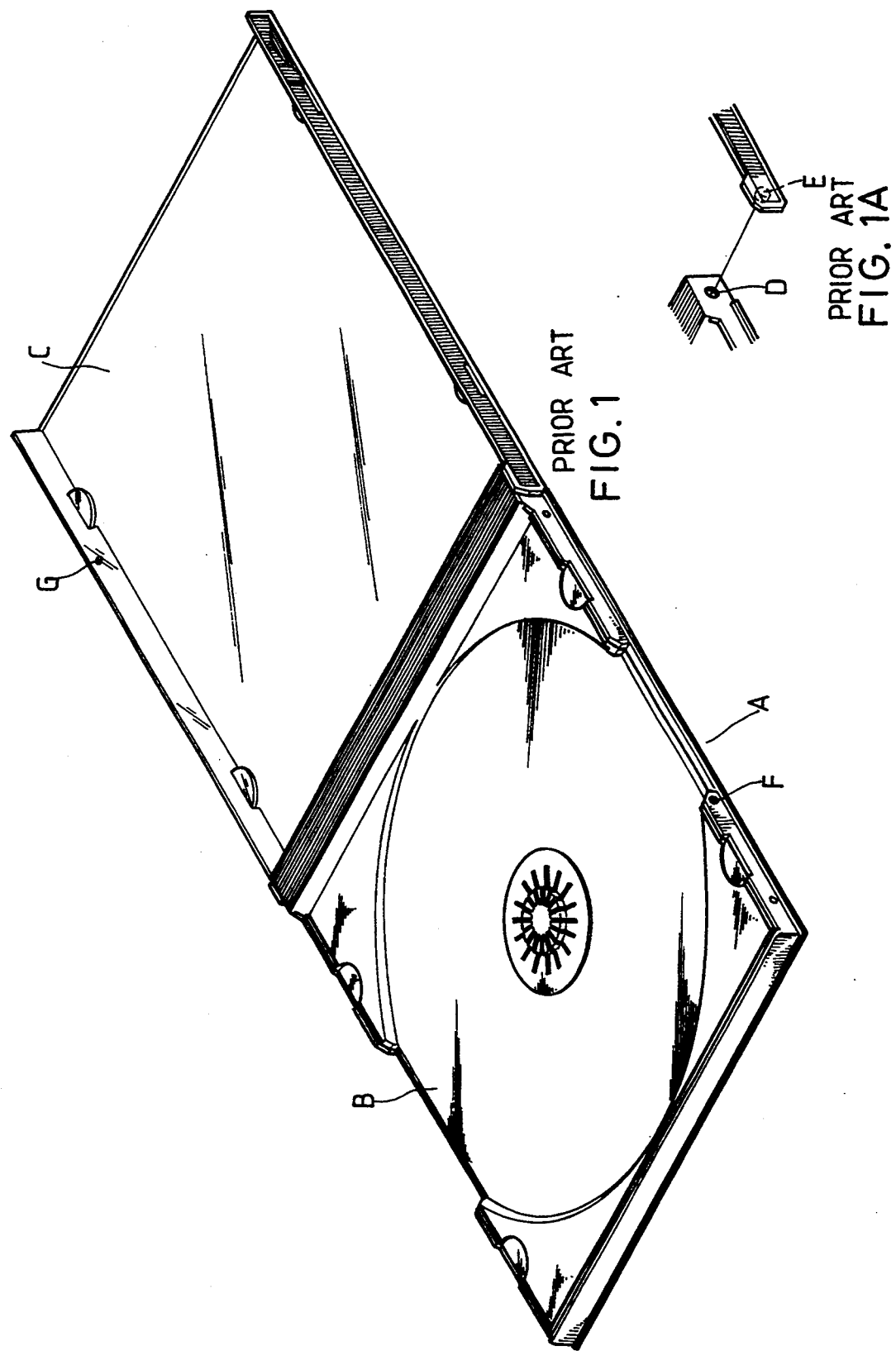
FIG. 1 is a perspective view of a conventional CD case.
Figure 2:
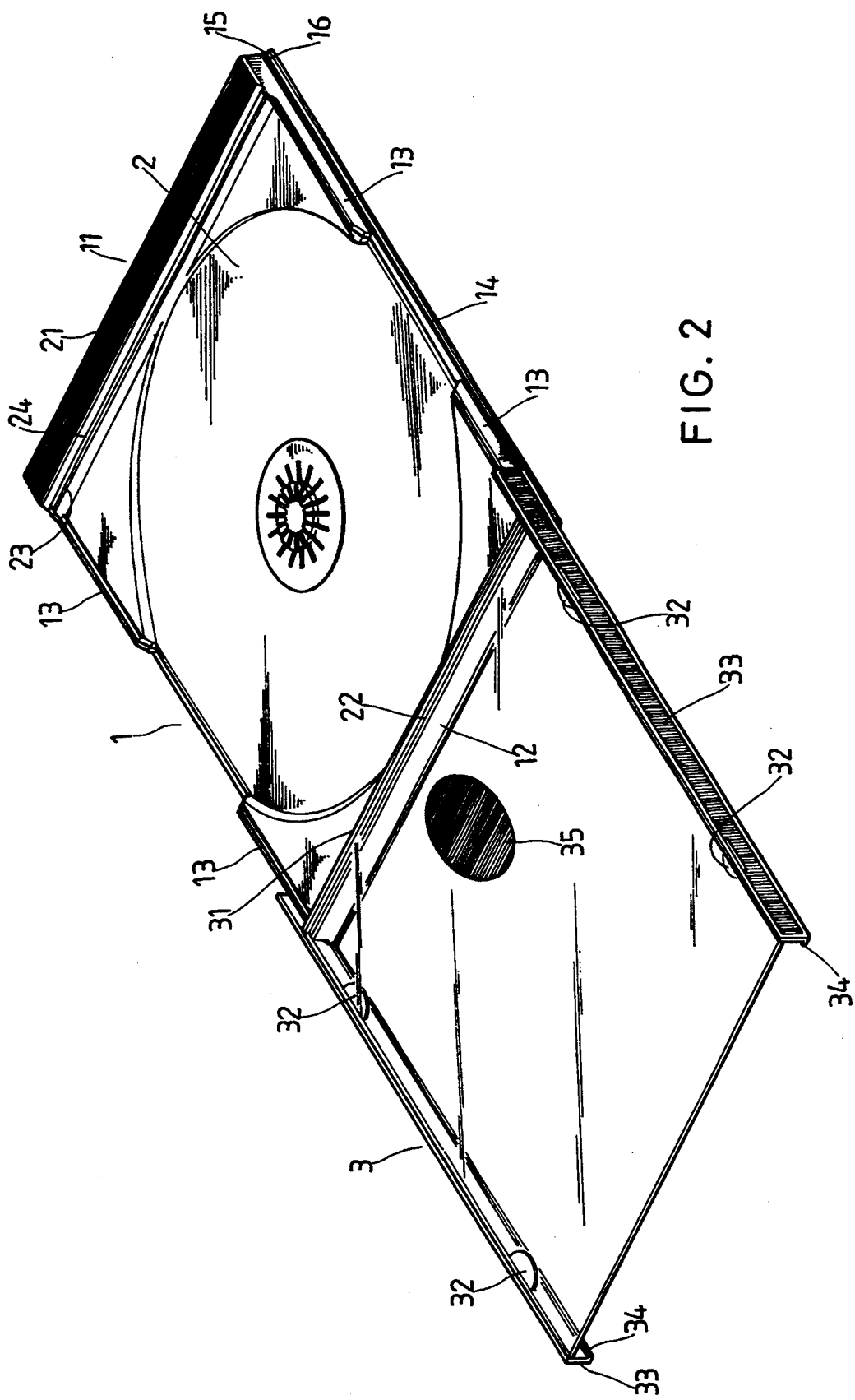
FIG. 2 is a perspective view showing an embodiment of the CD case of the present invention in opened condition.
Figure 3:
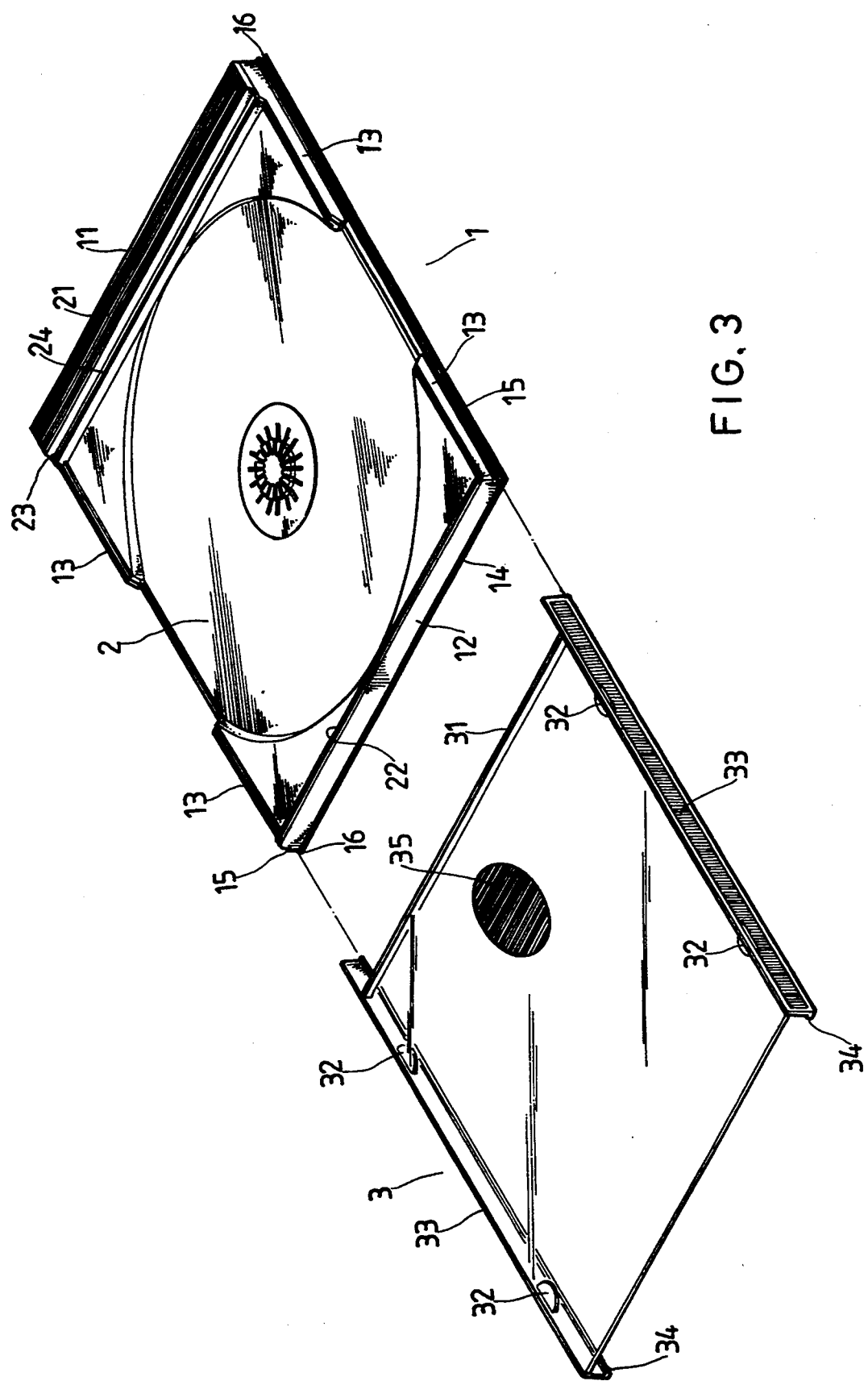
FIG. 3 is a perspective view showing the embodiment of the CD case of the present invention with the cover plate in disengaged condition.

First referring to FIGS. 2 and 3, which are the perspective view showing an embodiment of the CD case of the present invention in opened condition and the perspective view showing the embodiment of the CD case of the present invention with the cover plate in disengaged condition. The embodiment of the improved structure for compact disk cases of the present invention comprises a hollow rectangular case body 1 having a fully opened top portion, a disk holder 2 placed in the case body 1, and a cover plate 3 covering the case body 1. The periphery of the case body 1 is formed with a front wall 11, a rear wall 12, and left and right sidewalls 13, the the bottom wall 14 of the case body 1 is projected out from the left and sidewalls 13. The disk holder 2 is rectangular in shape for placing into the case body i and can receive only one CD. A lateral stop seat 21 is projected from the front section of the disk holder 2 and an integral lateral recessed face 23 is provided in the rear section of the front stop seat 21 and formed with a lateral arcuated duct 4. The left and right sidewalls 13 of the case body i are each provided at the lower section with a groove 16 extending from the front to the rear, and the sidewalls 33 of the cover plate 3 are each formed inwardly at the bottom edge with an integral guide strip 34, said guide rails 34 mating with the groove 16 such that the cover plate 3 can be slip-fit with the case body 1.

A longitudinal guide rail 15 is extended horizontally outwardly from each of the left and right sidewalls 13 of the case body 1, and a groove 16 is formed between the left and right end edge of the bottom wall 14 and the guide rail 15, respectively, for mating with the inwardly extending guide rails 34 on the bottom edge of the sidewalls 33 of the cover plate 3.

The top wall of the cover plate 3 is provided at the front edge with a lateral downward facing stop strip 31 which can be caught in the arcuate duct 24 in front of the disk holder 2. The sidewalls 33 of the cover plate 3 are each provided at the front and the rear portion, respectively, with an inwardly extending lug 32 with a gap between the lugs 32 and the bottom face of the top wall for placing sheets of lyrics, introduction (not shown), etc.

The sidewalls 33 of the cover plate 3 are extended forwardly beyond the front edge of the top wall so as to provide resiliency. When the cover plate 3 is assembled forwardly into the case body 1, by applying force on the cover plate 3 and due to the resiliency of the cover plate 3 allowing slight deformation, the stop strip 31 on the front end of the cover plate 3 is caused to pass over the rear wall 12 of the case body 1 and the rear wall 22 of the disk holder 2, and the guide rails 34 of the cover plate 3 move into the groove 16 of the case body 1. The various members in the embodiment of the present invention are all made of a plastic material.

Referring to FIGS. 4 and 5, which are the perspective view showing the embodiment of the CD case of the present invention in closed condition, and the cross section view showing the embodiment of the CD case of the present invention. In the embodiment of the present invention, the CD case is closed by pushing the cover plate 3 forward, causing the bottom edge of the stop strip 31 on the front end of the cover plate 3 to pass over the recessed face 23 on the disk holder 2, and become caught in the arcuate duct 24, the arcuate duct 24 being only slightly recessed so as to avoid overtightened catching.

The top face of the cover plate 3 is provided at the central portion of the front middle section with an embossed area 35, the embossed area 35 having a plurality of laterally projected stripes for increasing friction during contact. When the consumer opens the CD case, by holding the bottom wall 14 of the case body 1 with four fingers of one hand and having the front end of the thumb of the same hand in contact with the embossed area 35 (indicated by the imaginery lines in FIG. 4) of the cover plate 3, and by applying force with the thumb to push the cover plate 3 backward, the stop strip 31 of the cover plate 3 can be driven to disengage from the arcuate duct 24 and slid backward smoothly to position into the condition as shown in FIG. 2. Then the stop strip 31 of the cover plate 3 is stopped by the rear wall 22 of the disk holder 2 and the foremost section of the left and right guide rails 34 of the cover plate 3 are still positioned in the groove 16, thus to avoid complete disengagement of the cover plate 3.

It can be seen from the foregoing, in the embodiment of the improved structure for CD cases according to the present invention, the left and right sidewalls are each provided with a groove extending from the front to the rear and the cover plate is provided with mating guide rails such that both can be slip-fit with each other. A consumer can open the CD case by holding the bottom of the case body with four fingers of one hand with only the thumb of the same hand applying force to push the cove plate, driving the cover plate to slide backward to position and then the CD can be easily take out. The entire operation of opening and closing is both smooth and exact.

Although the preferred embodiment has been described in detail, is should be understood that various modifications and changes can be made by those skilled in the art without departing from the spirit and scope of the the present invention as defined in the appended claim.

I claim:

1. A structure for compact disc cases comprising:

a hollow rectangular case body having a fully opened portion;

a disk holder for fitting forwardly into said case body, a lateral front stop seat being projected from a front section of said holder;

a cover plate for covering over the case body and the disk holder, a front end of a top wall of said cover plate abutting against the front stop seat of said holder and left and right sidewalls thereof being positioned outside left and right sidewalls of said case body;

the left and right sidewalls of said case body being each provided at outside with a groove extending from a front to a rear;

the front stop seat of said disk holder being provided at a rear section with an integral lateral recessed face, said recessed face being formed with a lateral arcuated duct;

the left and right sidewalls of said cover plate being each provided with an inwardly projecting front and rear guide rail, respectively, for slip-fitting into left and right grooves of said case body and lower ends of stop strips on a bottom edge of the front end of the top wall of the cover plate being caught into the arcuated duct on the recessed face of said disk holder to be brought into closed condition; and the disk case being opened by pushing the cover plate to slide backward, the stop strips of the cover plate being stopped by a rear wall of the case body with a foremost section of the left and right guide rails of the cover plate being still positioned in a rear section of the grooves of the case body.

* * * * *